United States Patent [19]
Oshima et al.

[11] Patent Number: 5,241,255
[45] Date of Patent: Aug. 31, 1993

[54] FAILURE DETECTOR FOR REGENERATION POWER ABSORBING MEANS

[75] Inventors: Kenji Oshima, Chiba; Yasutami Kito, Aichi, both of Japan

[73] Assignee: Otis Elevator Company, Farmington, Conn.

[21] Appl. No.: 305,123

[22] PCT Filed: Feb. 26, 1988

[86] PCT No.: PCT/JP88/00212

§ 371 Date: Oct. 24, 1988

§ 102(e) Date: Oct. 24, 1988

[87] PCT Pub. No.: WO88/06817

PCT Pub. Date: Sep. 7, 1988

[30] Foreign Application Priority Data

Feb. 26, 1987 [JP] Japan .................. 62-27786[U]

[51] Int. Cl.$^5$ .............................................. H02P 3/00
[52] U.S. Cl. ...................................... 318/801; 318/380; 187/133; 361/33
[58] Field of Search ............... 318/759-762, 318/376-381, 434, 799-807; 187/119, 105, 109, 112, 130, 133; 361/23, 29-31, 33, 104, 88, 93, 10

[56] References Cited

U.S. PATENT DOCUMENTS

| 4,051,418 | 9/1977 | O'Berto et al. | 318/759 |
| 4,354,217 | 10/1982 | Mahon | 361/104 |
| 4,478,315 | 10/1984 | Nomura | 340/19 R |
| 4,545,464 | 10/1985 | Nomura | 318/762 |
| 4,554,607 | 11/1985 | Mora | 361/104 |
| 4,667,776 | 5/1987 | Nomura | 318/759 |
| 4,678,063 | 7/1987 | Kitaoka et al. | 187/119 |
| 4,678,980 | 7/1987 | Sugimoto et al. | 318/759 |
| 4,749,932 | 7/1988 | Yonemoto | 318/759 |
| 4,761,600 | 8/1988 | D'Atre et al. | 318/759 |
| 4,787,021 | 11/1988 | Hobari et al. | 318/803 X |
| 4,823,066 | 4/1989 | Yoshiki et al. | 318/759 |
| 4,882,782 | 11/1989 | Kimizuka et al. | 361/104 |
| 4,902,954 | 2/1990 | Oshima et al. | 318/806 X |

FOREIGN PATENT DOCUMENTS 0067716 6/1982 European Pat. Off. .
WO88/01450 8/1987 PCT Int'l Appl. .

Primary Examiner—A. Jonathan Wysocki
Attorney, Agent, or Firm—Joseph P. Abate

[57] ABSTRACT

A control system for an electric motor includes a detector associated with a regenerated power absorbing circuit for monitoring operation of the regenerated power absorbing circuit for detecting an abnormal condition thereof. The control circuit is responsive to detection of abnormality in the regenerated power absorbing circuit for controlling operation of an inverter in a fail-safe mode.

23 Claims, 2 Drawing Sheets

FAILURE DETECTOR FOR REGENERATION POWER ABSORBING MEANS

BACKGROUND OF THE INVENTION

1. Field of the Invention

The present invention relates generally to a control system for controlling a power supply for an electric motor. More specifically, the invention relates to a fail-safe system in a drive control system of an electric motor, such as an induction motor. Further particularly, the invention relates to a fail-safe system which detects abnormality in a regenerated power absorbing circuit and thus detects abnormality in a power converter for performing fail-safe operation.

2. Description of the Background Art

British Patent First (unexamined) publication 2,167,252, published on May 21, 1986, discloses an elevator control system including an elevator hoist motor. The disclosed system also includes a drive circuit for the elevator hoist motor, which circuit has three phase alternating current rectifying converter. A regenerated energy absorbing circuit is connected across direct current (DC) terminals of the converter and comprises a regenerated energy absorbing or consuming resistor and a switch which comprises a switching transistor. The switch closes to permit the regenerated power to flow through the resistor for absorption thereof while the motor is in the operation of regenerative mode.

Generally, the regenerated power absorbing resistor tends to burn out in a short period when subjected to excess voltage exceeding its a rated voltage. Such excess voltage may be applied to the regenerated power absorbing resistor upon failure in a circuit component, such as the converter, for example. Breakage of the regenerated power absorbing resistor also tends to occur when the frequency of acceleration and deceleration becomes higher than a predetermined value. In such case, the regenerated power to be consumed by the regenerated power absorbing resistor becomes greater than the capacity of the resistor. As a result, the resistor tends to become over-heated or in the worst case broken. Furthermore, failure of the switch, i.e. switching transistor, also results in breakage of the resistor.

Once the breakage of the regenerated power absorbing resistor occurs, the regenerated energy of the motor drive circuit cannot be consumed which causes the current voltage in the circuitry to rise. This results in stoppage of an inverter via an excess voltage trip circuit. This makes it impossible to accurately control the position of a cage of the elevator. In such emergency situation, it is usual to generate an alarm and stop the motor. When this occurs, the cage may stop at an intermediate position trapping any passangers who may be in the cage.

SUMMARY OF THE INVENTION

Therefore, it is an object of the present invention to provide a control system for an electric motor which can detect abnormality in the regenerated power absorbing circuit and perform a fail-safe operation.

Another object of the invention is to provide a less expensive detector for detecting abnormality in the regenerated power absorbing circuit in the power supply for an electric motor, such as an induction motor.

A further object of the invention is to provide a motor control system for controlling the operation of an elevator hoist motor, which performs a fail-safe operation in response to failure of the regenerated power absorbing circuit, wherein the elevator cage is moved to a position where the passengers therein can get out at the floor which is closest to the position where failure is detected.

In order to accomplish the aforementioned and other objects, a control system for an electric motor, according to the present invention, includes a detector associated with a regenerated power absorbing circuit for monitoring operation of the regenerated power absorbing circuit for detecting an abnormal condition thereof. The control circuit is responsive to detection of abnormality in the regenerated power absorbing circuit for controlling operation of an inverter in a fail-safe mode.

According to one aspect of the invention, a power supply control system for an electric motor comprises a direct current power source means for supplying direct current power, an inverter means operative for receiving the direct current power from the direct current source means and applying alternating current driving power to the electric motor for driving the latter in a controlled driving direction in a first mode, and in a second mode, for outputting regenerated power from the electric motor to the direct current power source means, a regenerated power absorbing means, interposed between the direct current power source means and the inverter means, for absorbing the regenerated energy from the inverter means, an abnormality detector means, associated with the regenerated power absorbing means, for monitoring the operating condition of the latter to produce an abnormal condition indicative signal when abnormality of the regenerated power absorbing means is detected, and a control means, associated with the inverter means for controlling operation of the latter to drive the electric motor in a desired direction at a controlled speed, the control means being responsive to the abnormal condition indicative signal of the abnormality detector means for performing a predetermined fail-safe operation to control operation of the inverter means in fail-safe mode.

According to another aspect of the invention, a fail-safe system for a power supply system of an elevator hoisting motor which drives an elevator cage up and down with stops at one or more predetermined elevational positions for allowing passengers to enter into and exit from the elevator cage, comprises a direct current power source means for supplying a direct current power, which includes an alternating current power source and a converter for converting alternating current received from the alternating current power source into direct current power, an inverter means operative for receiving the direct current power from the direct current source means and applying alternating current driving power to the electric motor for driving the latter in a controlled driving direction, and for outputting to the direct current power source a regenerated power from the electric motor, a regenerated power absorbing means, interposed between the direct current power source means and the inverter means, for absorbing the regenerated energy from the inverter means, an abnormality detector means, associated with the regenerated power absorbing means, for monitoring operating condition of the latter to produce an abnormal condition indicative signal when abnormality of the regenerated power absorbing means is detected, and a control means, associated with the inverter means for controlling operation of the latter to drive the electric motor in a desired direction at a controlled speed, the control means being responsive to the abnormal condition indicative signal of the abnormality detector means for performing a predetermined fail-safe operation to control operation of the inverter means in the fail-safe mode for driving the cage to one of the predetermined elevational positions.

In the preferred construction, the regenerated power absorbing means includes a switch means associated with the inverter means and which is variable the switch position or switch state according to the operation mode of the inverter means between a first switch position, in which current flow through the regenerating power absorbing means is blocked and a second switch position, in which current flow through the regenerated power absorbing means is permitted, so that the switch is held at the first switch position while the inverter means operates in the first mode and at the second switch position while the inverter means operates in the second mode. Also, the regenerated power absorbing means comprises a resistor for absorbing the regenerated energy.

In practice, the abnormality detector means monitors the potential at the regenerated power absorbing means. The abnormality detector means monitors variation of the potential in the regenerated power absorbing circuit and detects abnormality of the latter based on a comparison frequency of variation of the potential thereof in relation to a predetermined frequency. The abnormality detector means produces the abnormal condition indicative signal when the frequency of occurrence of variation of potential in the regenerated power absorbing means is lower than the predetermined frequency.

In the practical fail-safe operation, the control means maintains the revolution speed of the elevator hoisting motor at a speed so selected as to minimize the magnitude of energy regenerated by the motor.

Preferably, the motor driving speed in the fail-safe operation is determined on the basis of the loaded weight of the cage and traveling speed of the cage immediately before the failure is detected.

According to a further aspect of the invention, a failure detector is provided in a power supply control system for an induction motor, the power supply system comprises a direct current power source means for supplying a direct current power, an inverter means operative for receiving the direct current power from the direct current source means and applying alternating current driving power to the electric motor for driving the latter in a controlled driving direction, and for outputting regenerated power from the electric motorto the direct current power source a regenerated power absorbing means, interposed between the direct current power source means and the inverter means, for absorbing the regenerated energy from the inverter means, and a control means, associated with the inverter means for controlling operation of the latter to drive the electric motor in a desired direction at a controlled speed, wherein the fail detector comprises an abnormality detector means, associated with the regenerated power absorbing means, for monitoring variation of the potential in the regenerated power absorbing circuit for detecting abnormality of the latter based on frequency of variation of the potential in relation to a predetermined frequency.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
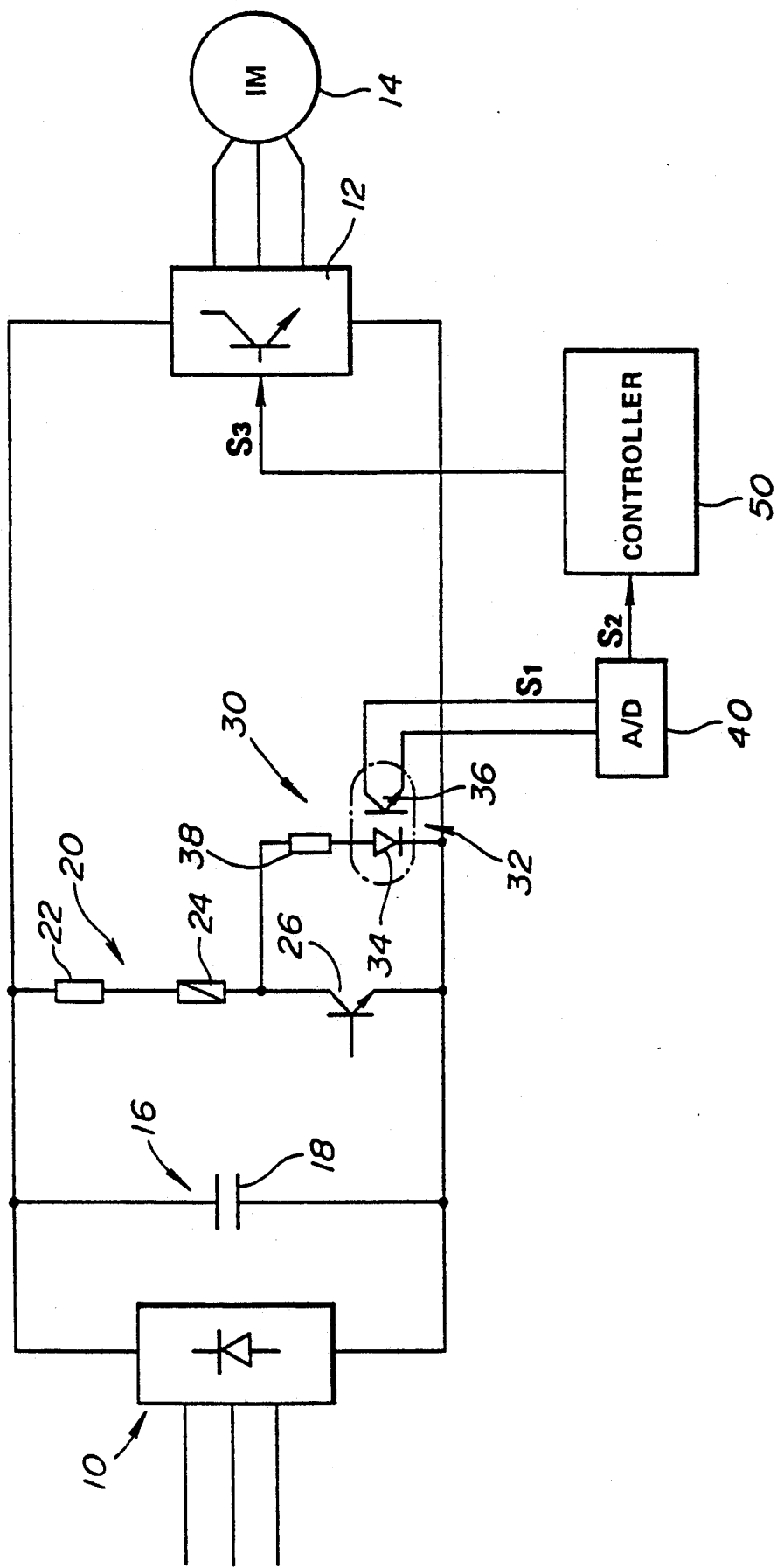
FIG. 1 is a schematic block diagram of the preferred embodiment of a motor drive control system, according to the present invention, which control system may perform a fail-safe operation upon failure of a regenerated power absorbing circuit.

Referring now to the drawings, particularly to FIG. 1, the preferred embodiment of a motor drive control system, according to the present invention, has a three phase alternating current (AC) rectifying AC/DC converter 10 which is of per se well known construction. As is well known, the AC/DC converter 10 is connected to a power source so as to receive therefrom three phase alternating current R, S, T and rectifies or converts the received three phase alternating current into direct current (DC). The AC/DC converter 10 thus has a pair of DC terminals connected to DC terminals of a DC/AC converter 12. As is well known, the DC/AC converter 12 may comprise an inverter circuit and is designed to convert DC current received from the AC/DC converter 10 into three phase alternating current which is supplied to an electric motor 14, such as an induction motor.

A smoothing circuit 16 is connected across the DC terminals of the AC/DC converter 10. The smoothing circuit 16 includes a smoothing capacitor 18. A regenerated power absorbing circuit 20 is also connected across the DC terminals of the AC/DC converter 10. The regenerated power absorbing circuit 20 comprises a regenerated power absorbing resistor 22, a fuse 24 and switch 26. The regenerated power absorbing resistor 22, the fuse 24 and the switch 26 constitute a series circuit. As will be appreciated, the fuse 24 serves for protecting the regenerated power absorbing resistor 22 by blowing out in response to excess voltage which would otherwise tend to cause breakage of the resistor.

The regenerated power absorbing resistor 22 performs the per se well known function of absorbing or consuming regenerated power from the DC/AC converter 12 which serves as regenerative inverter component. The switch 26 comprises a switching transistor which is switchable between a conductive state and non-conductive state. The switching transistor of the switch 26 is held non-conductive while the motor 14 is accelerated by power supplied thereto from AC/DC converter 10 via the DC/AC converter 12. The switching transistor turns to a conductive state during the regenerative mode operation of the motor 14.

A fail-detector circuit 30 is connected between the regenerated power absorbing circuit 20 and the DC/AC converter 12. The detector circuit 30 is designed to detect abnormal state of the regenerated power absorbing circuit 20 for generating a detector signal $S_1$. The detector signal $S_1$ is a variable level analog signal having a value indicative of the current level in the detector which, in turn, represents operating condition of the regenerated power absorbing resistor 22. The detector signal $S_1$ of the detector circuit 30 is fed to a analog-to-digital (A/D) converter circuit 40 which generates a digital signal $S_2$ corresponding to the detector signal value. The A/D converter circuit 40 feeds the digital signal $S_2$ to CPU 50. The CPU 50 controls operation of the DC/AC converter 12 depending upon the level of the digital signal $S_2$ input from the A/D converter 40.

In practice, the detector circuit 30 comprises a photo-coupler 32 connected to the regenerated power absorbing resistor 22 via the fuse 24 in parallel to the switch 26, via a resistor 38. The photo-coupler 32 comprises a light emitting diode 34 and a photo-transistor 36.

In the circuit construction set forth above, while the DC/AC converter 12 operates in regenerative state to apply the regenerated power to the regenerated power absorbing circuit 20, the switch 26 alternatively switches its state between closed state to permit the regenerated current through the regenerated power absorbing resistor 22 and open state to block regenerated current to pass therethrough. This chopping operation of the switch 26 is known in the art and takes place depending upon the potential to be exerted thereon. Namely, the switch 26 closes to become conductive state when the potential rises across a given level and opens to become non-conductive state when the potential drops across the given level. At this condition, the potential applied to the light emitting diode 34 varies LOW level and HIGH level depending upon the state of the switch 26. Therefore, the light emitting diode 34 is switched OFF and ON alternatively according to switching of the switch 26 between closed and open states respectively. The photo-transistor 36 is held OFF when the light from the light emitting diode 34 is not detected and turns ON in reponse to the light from the diode. The photo-transistor outputs HIGH level detector signal $S_1$ while it is held ON. As a result, the photo-transistor switches ON and OFF alternatively and therefore the level of the detector signal $S_1$ varies between HIGH and Low level.

It will be appreciated, during chopping operation, the switch 26 alternates the state between open and closed states in a short period with approximately regular intervals.

On the other hand, when the DC/AC converter 12 has no DC output or is not in regenerative state, the switch 26 becomes open. Therefore, the DC current from the AC/DC converter 10 passes through the regenerated power absorbing resistor 22 and flow through the detector circuit 30. Therefore, the potential applied to the light emitting diode 34 is maintained at HIGH level to illuminate the latter. The photo-transistor 36 detects the light output of the light emitting diode 36 to output HIGH level detector signal $S_1$.

The A/D converter 40 outputs a digital signal having value "0" in response to the LOW level detector signal $S_1$ and having value "1" in response to the HIGH level detector signal $S_1$. The CPU 50 detects operating condition of the motor 14 and the DC/AC converter 12 based on the digital signal to control operation of the DC/AC converter 12.

Therefore, when the regenerated power absorbing circuit 20 is in the normal condition, the digital signal value is held "1" as long as the DC/AC converter 12 outputs no DC current or is not in regenerative state. On the other hand, the digital signal value alternates between "1" and "0" every time the motor driving mode changes from acceleration mode to deceleration mode in which power is regenerated.

As will be appreciated from the, foregoing discussion, the switch 26 will never be held in the closed position for a long period. Consequently, the digital signal value of the A/D converter 40 cannot be held "0" for a long period as long as the regenerated power absorbing circuit 20 operates in normal state. Therefore, failure of the regenerated power absorbing circuit 20 can be detected by monitoring the period of time, in which the value of the digital signal is held at "0".

When breakage of the regenerated power absorbing resistor 22 occurs, the current, i.e. the DC current from the AC/DC converter 10 and the DC/AC converter 12, does not get applied to the light emitting diode 34. Thus, the light emitting diode 34 does not become illuminated. Therefore, signal level of the detector signal $S_1$ is constantly held LOW. As a result, the digital signal value to be input to the CPU 50 remains "0". When the period in which the digital signal value is held "0" exceeds a predetermined period which may be determined in view of possible longest chopping interval, CPU 50 makes a judgement that the regenerated power absorbing circuit 20 fails.

In cases that the motor 14 must be driven in the non-regenerative mode after operating in the regenerative mode for a predetermined period, failure of the regenerated power absorbing circuit 20 can be detected by checking the input level from the A/D converter 40. Specifically, when the input level is held "0" despite acceleration mode operation of the motor 14, it indicates breakage of the regenerated power absorbing resistor 22.

The CPU 50 performs a fail-safe operation when failure of the regenerated power absorbing circuit 20 is detected.

In cases where the elevator hoisting motor, direction and magnitude of regenerated energy is variable depending upon direction of the cage motion, i.e. up and down, and load condition, i.e. weight of passengers and luggage in the cage, the regenerated energy can be minimized by appropriately selecting driving direction of the motor in view of the direction of the cage motion and the load. Furthermore, since the magnitude of the regeneration energy increases in proportion to driving speed of the cage, in other words, by driving the motor at substantially low speed, the energy to be regenerated becomes substantially small. The CPU 50 performs fail-safe operation to control the DC/AC converter 12 for driving the motor 14 in a direction and speed selected to minimize the energy to be regenerated.

Figure 2:
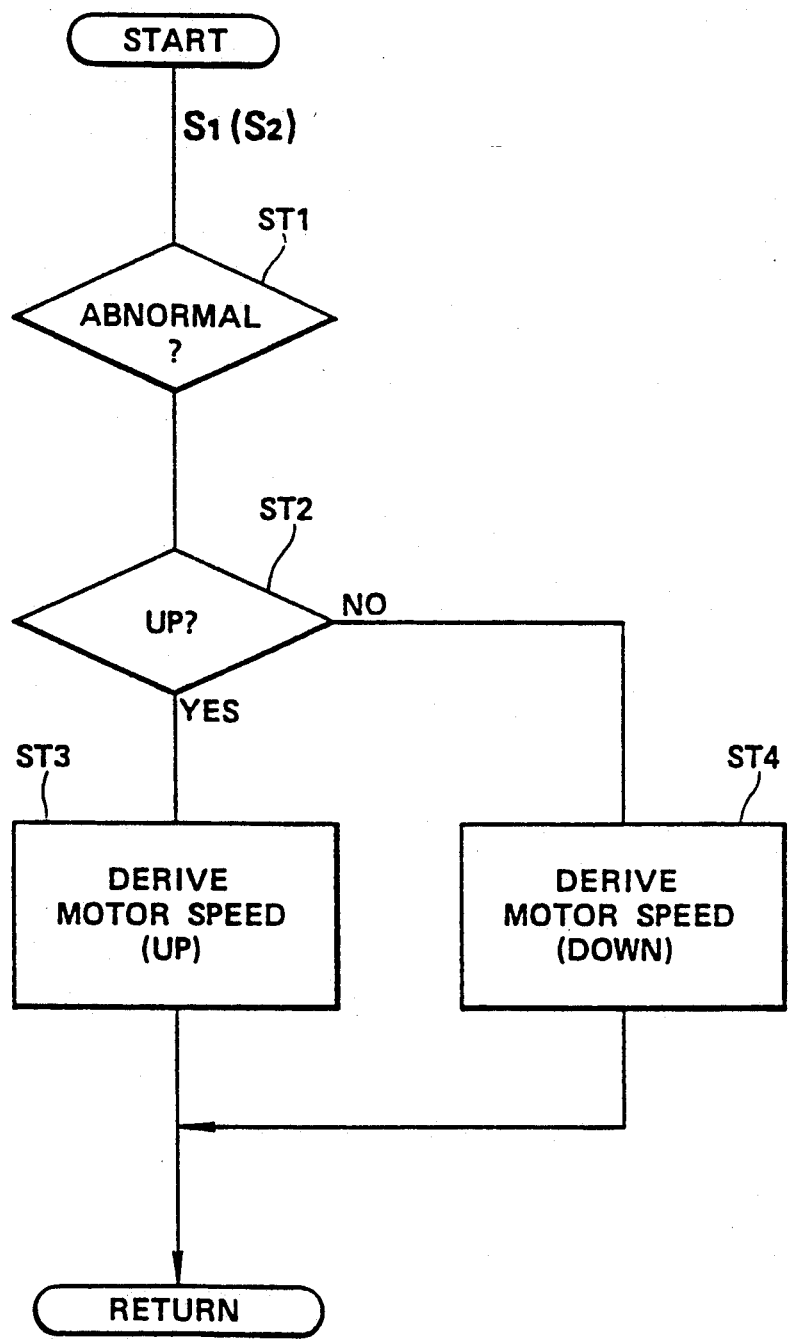
FIG. 2 is a flowchart showing fail-monitoring and fail-safe operation performed in practice by the control system of FIG. 1.

FIG. 2 shows the process of a fail-safe operation performed by the CPU 50. As will be appreciated, the process shown in FIG. 2 may be triggered cyclically at given timings. The trigger timing may be for example, predetermined intervals.

Immediately after starting the process, the CPU 50 checks whether the regenerated power absorbing circuit 20 is in normal condition or not. If the detected condition of the regenerated power absorbing circuit 20 is normal, process goes END and normal elevator control process contines.

On the other hand, when abnormality of the regenerated power absorbing circuit 20 is detected in the process of the step $ST_1$, the cage travelling direction is checked at a step ST$_2$. In practice, the cage travelling direction may be judged based on the driving direction of the motor 14. When the cage is traveling upward, a process is performed to derive a motor speed for the fail-safe operation, which motor speed will be hereafter referred to as "fail-safe drive speed" and motor drive direction which will be hereafter referred to as "fail-safe drive direction", and is determined on the basis of the motor driving direction and load in the cage deteced immediately before the fail-safe operation at step ST$_3$. On the other hand, when the cage is in downward traveling, a process is performed to derive the fail-safe drive speed and fail-safe drive direction on the basis of the motor driving direction and load on the cage detected immediately before the fail-safe operation ST$_4$.

The fail-safe drive speed of the motor is so selected as to minimize the energy regenerated during deceleration of the cage. Namely, the fail-safe drive speed is determined in a speed range where energy for causing regenerated energy can be absorbed by power losses in a power train, for example. On the other hand, the fail-safe drive direction may be determined in view of the load on the cage to minimize the inertia moment to be exerted on the motor during deceleration.

Based on the fail-safe drive speed as derived at the step ST$_3$ or ST$_4$, the CPU 50 outputs a control signal S$_3$ to control operation of the DC/AC converter 12 for adjusting the motor driving speed to the fail-safe drive speed.

By the fail-safe operation set forth above, the elevator cage can be driven to an elevation where the passengers in the cage can safely exit therefrom, even when failure in the regenerated power absorbing circuit 20 occurs.

It may be possible to generate an alarm simultaneously to the safe operation in the steps ST$_3$ and ST$_4$ for alarming abnormal condition of the power supply circuit.

It should be noted that embodiments employing photo-coupler may be the preferred since it requires smaller installation space and is inexpensive.

It will be appreciated that the photo-coupler employed in the shown embodiment for detecting failure of the regenerated power absorbing circuit 20, can be replaced with a detecany of variety of means which can monitor the level of current flowing through the regenerated power absorbing circuit 20. Further it will be easily recognized by those skilled in the art that alternatives exist for all of the circuit components, not last the photo-coupler any other components, and should therefore be regarded as possible modifications for implementing the invention.

Therefore, although the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

We claim:

1. A power supply control system for an electric motor comprising:

a direct current power source means for supplying direct current power;

an inverter means operative for receiving said direct current power from said direct current source means for applying alternating current driving power to said electric motor for driving the latter in a controlled driving direction in a first mode, and for outputting to said direct current power source a regenerated power from said electric motor in a second mode;

a regenerated power absorbing means, interposed between said direct current power source means and said inverter means, for absorbing said regenerated energy from said inverter means;

an abnormality detector means, associated with said regenerated power absorbing means, for monitoring operating condition of the latter to produce an abnormal condition indicative signal when abnormality of said regenerated power absorbing means is detected; and a control means, associated with said inverter means for controlling operation of the latter to drive said electric motor in a desired direction at a controlled speed, said control means being responsive to said abnormal condition indicative signal of said abnormality detector means for performing a predetermined fail-safe operation to control operation of said inverter means in fail-safe mode.

2. A power supply control system as set forth in claim 1, wherein said regenerated ,power absorbing means includes a switch means associated with said inverter means variable between a first switch state, in which current flow through said regenerating power absorbing means is blocked and a second switch state, in which current flow through said regenerated power absorbing means is permitted, depending upon the operation mode of said inverter means, so that said switch is held in said first switch state while said inverter means operates in said first mode and in said second switch state while said inverter means operates in said second mode.

3. A power supply control system as set forth in claim 1, wherein said regenerated power absorbing means comprises a resistor for absorbing the regenerated energy.

4. A power supply control system as set forth in claim 1, wherein said abnormality detector means monitors potential at said regenerated power absorbing means.

5. A power supply control system as set forth in claim 4, wherein said abnormality detector means monitors variation of said potential in said regenerated power absorbing circuit for detecting abnormality of the latter based on frequency of variation of the potential in relation to a predetermined frequency.

6. A power supply control system as set forth in claim 5, wherein said abnormality detector means produces said abnormal condition indicative signal when said frequency of occurrence of variation of potential in said regenerated power absorbing means is lower than said predetermined frequency.

7. A power supply control system as set forth in claim 2, wherein said abnormality detector means monitors potential at said regenerated power absorbing means.

8. A power supply control system as set forth in claim 7 wherein said abnormality detector means monitors variation of said potential in said regenerated power absorbing circuit for detecting the abnormality of the latter based on frequency of variation of the potential in relation to a predetermined frequency.

9. A power supply control system as set forth in claim 8, wherein said abnormality detector means comprises a photo coupler connected to said regeneration power absorbing means in parallel to said switch means.

10. A power supply control system as set forth in claim 1, wherein said direct current power source comprises an alternating current power source and a converter for converting alternating current from said alternating current power source into direct current power.

11. A failure detector in a power supply control system for an induction motor, said power supply system comprising a direct current power source means for supplying direct current power, an inverter means operative for receiving said direct current power from said direct current source means and for applying alternating current driving power to said electric motor for driving the latter in a controlled driving direction, and for outputting a regenerated power from said electric motor to said direct current power source, a regenerated power absorbing means, interposed between said direct current power source means and said inverter means, for absorbing said regenerated energy from said inverter means, and a control means, associated with said inverter means for controlling operation of the latter to drive said electric motor in a desired direction at a controlled speed, wherein said failure detector comprising:

an abnormality detector means, associated with said regenerated power absorbing means, for monitoring variation of said potential in said regenerated power absorbing circuit for detecting abnormality of the latter based on the frequency of variation of the potential in relation to a predetermined frequency.

12. A failure detector as set forth in claim 11, wherein said abnormality detector means produces said abnormal condition indicative signal when said frequency of occurrence of variation of potential in said regenerated power absorbing means is lower than said predetermined frequency.

13. A failure detector as set forth in claim 12, which is so associated with said control means that said control means is responsive to said abnormal condition indicative signal of said abnormality detector means for performing predetermined fail-safe operation to control operation of said inverter means in a fail-safe mode.

14. A failure detector as set forth in claim 13, wherein said regenerated power absorbing means includes a switch means associated with said inverter means variable between a first switch state, in which current flow through said regenerating power absorbing means is blocked and a second switch stateion, in which current flow through said regenerated power absorbing means is permitted, depending on the operation mode of said inverter means, so that said switch is held said first switch state while said inverter means operates in said first mode and in said second switch state while said inverter means operates in said second mode.

15. A fail detector as set forth in claim 14, wherein said abnormality detector means comprises a photo coupler connected to said regeneration power absorbing means in parallel to said switch means.

16. A fail-safe system for a power supply system of an elevator hoisting motor which drives an elevator cage up and down with stops at one or more predetermined elevational positions for allowing passengers to enter into and exit from said elevator cage, comprising:

a direct current power source means for supplying a direct current power, which includes an alternating current power source and a converter receiving alternating current from said alternating current power source and converting it to a direct current power;

an inverter means operative for receiving said direct current power from said direct current source means and applying alternating current driving power to said electric motor for driving the latter in a controlled driving direction, and for outputting regenerated power from said electric motorto said direct current power source;

a regenerated power absorbing means, interposed between said direct current power source means and said inverter means, for absorbing said regenerated energy from said inverter means;

an abnormality detector means, associated with said regenerated power absorbing means, for monitoring operating condition of the latter to produce an abnormal condition indicative signal when abnormality of said regenerated power absorbing means is detected; and a control means, associated with said inverter means for controlling operation of the latter to drive said electric motor in a desired direction at a controlled speed, said control means being responsive to said abnormal condition indicative signal of said abnormality detector means for performing a predetermined fail-safe operation to control operation of said inverter means in fail-safe mode for driving said cage to one of said predetermined elevational positions.

17. A fail-safe system as set forth in claim 16, wherein said regenerated power absorbing means includes a switch means associated with said inverter means variable between a first switch stateion, in which current flow through said regenerating power absorbing means is blocked and a second switch position, in which current flow through said regenerated power absorbing means is permitted, depending on the operation mode of said inverter means, wherein said switch is held in said first switch state while said inverter means operates in said first mode and in said second switch state while said inverter means operates in said second mode.

18. A fail-safe system as set forth in claim 17, wherein said regenerated power absorbing means comprises a resistor for absorbing the regenerated energy.

19. A fail-safe system as set forth in claim 17, wherein said abnormality detector means monitors potential at said regenerated power absorbing means.

20. A fail-safe system as set forth in claim 19, wherein said abnormality detector means monitors variation of said potential in said regenerated power absorbing circuit for detecting the abnormality of the latter based on frequency of variation of the potential in relation to a predetermined frequency.

21. A fail-safe system as set forth in claim 20, wherein said abnormality detector means produces said abnormal condition indicative signal when said frequency of occurrence of variation of potential in said regenerated power absorbing means is lower than said predetermined frequency.

22. A fail-safe system as set forth in claim 16, wherein said control means controls the revolution speed of the elevator hoisting motor at a speed so selected as to minimize magnitude of energy to be regenerated by the motor.

23. A fail-safe system as set forth in claim 22, wherein said control means derives said motor driving speed in the fail-safe operation on the basis of the loaded weight of the cage and travelling speed of the cage immediately before the failure is detected.

* * * * *